United States Patent [19]

Vaudry

[11] Patent Number: 5,542,711
[45] Date of Patent: Aug. 6, 1996

[54] DEVICE FOR FITTING A HOT ELEMENT TO A HOLLOW BODY MADE OF THERMOPLASTIC INCLUDING AT LEAST ONE COLD FLUID INLET, AND HOLLOW BODY INCLUDING SUCH A DEVICE

[75] Inventor: Jean-Paul Vaudry, Ammerschwihr, France

[73] Assignee: Orbey Plastiques and Industries, Velizy, France

[21] Appl. No.: 362,566

[22] PCT Filed: Jun. 30, 1993

[86] PCT No.: PCT/FR93/00662

§ 371 Date: Jan. 3, 1995

§ 102(e) Date: Jan. 3, 1995

[87] PCT Pub. No.: WO94/01673

PCT Pub. Date: Jan. 20, 1994

[30] Foreign Application Priority Data

Jul. 1, 1992 [FR] France .................... 92 08104

[51] Int. Cl.$^6$ .................... F16L 47/00; F02M 25/07
[52] U.S. Cl. .................... 285/41; 123/568; 285/215
[58] Field of Search .................... 285/41, 187, 205, 285/215, 39; 123/568, 570, 571

[56] References Cited

U.S. PATENT DOCUMENTS

| | | | |
|---|---|---|---|
| 3,612,584 | 10/1971 | Taylor . | |
| 4,960,096 | 10/1990 | Sukimoto et al. | 123/570 |
| 5,201,549 | 4/1993 | Davey | 285/39 |
| 5,207,714 | 5/1993 | Hayashi et al. | 123/568 |
| 5,333,917 | 8/1994 | Davey et al. | 285/205 |
| 5,425,347 | 6/1995 | Zinke, II | 123/568 |

FOREIGN PATENT DOCUMENTS

| | | |
|---|---|---|
| 0445902 | 9/1991 | European Pat. Off. . |
| 0486338 | 5/1992 | European Pat. Off. . |
| 2925495 | 1/1981 | Germany . |

*Primary Examiner*—Eric K. Nicholson
*Attorney, Agent, or Firm*—Young & Thompson

[57] ABSTRACT

The device is used to fit a hot element (8) to a hollow body (1) including at least one cold fluid inlet pipe (2) and at least one fluid outlet pipe (3b), said hollow body (1) being made of a thermoplastic which cannot withstand the temperature of the hot element (8). The device includes an inlet adapter (9) of a single piece with the hollow body (1) and intended to surround said hot element (8) without contact, guide and retaining member (10) for keeping the hot element (8) out of contact with the inlet adapter (9) and retaining it inside the latter, seal (11) for sealing between the outer peripheral surface of the hot element (8) and the inner peripheral surface of the adapter (9), and means for causing at least some of the fluid penetrating the hollow body (1) to circulate through the space (14) lying between the adapter (9) and the hot element (8). Use especially for fitting an internal combustion engine exhaust gas recirculation pipe to an air intake manifold, made of thermoplastic, of said engine.

11 Claims, 3 Drawing Sheets

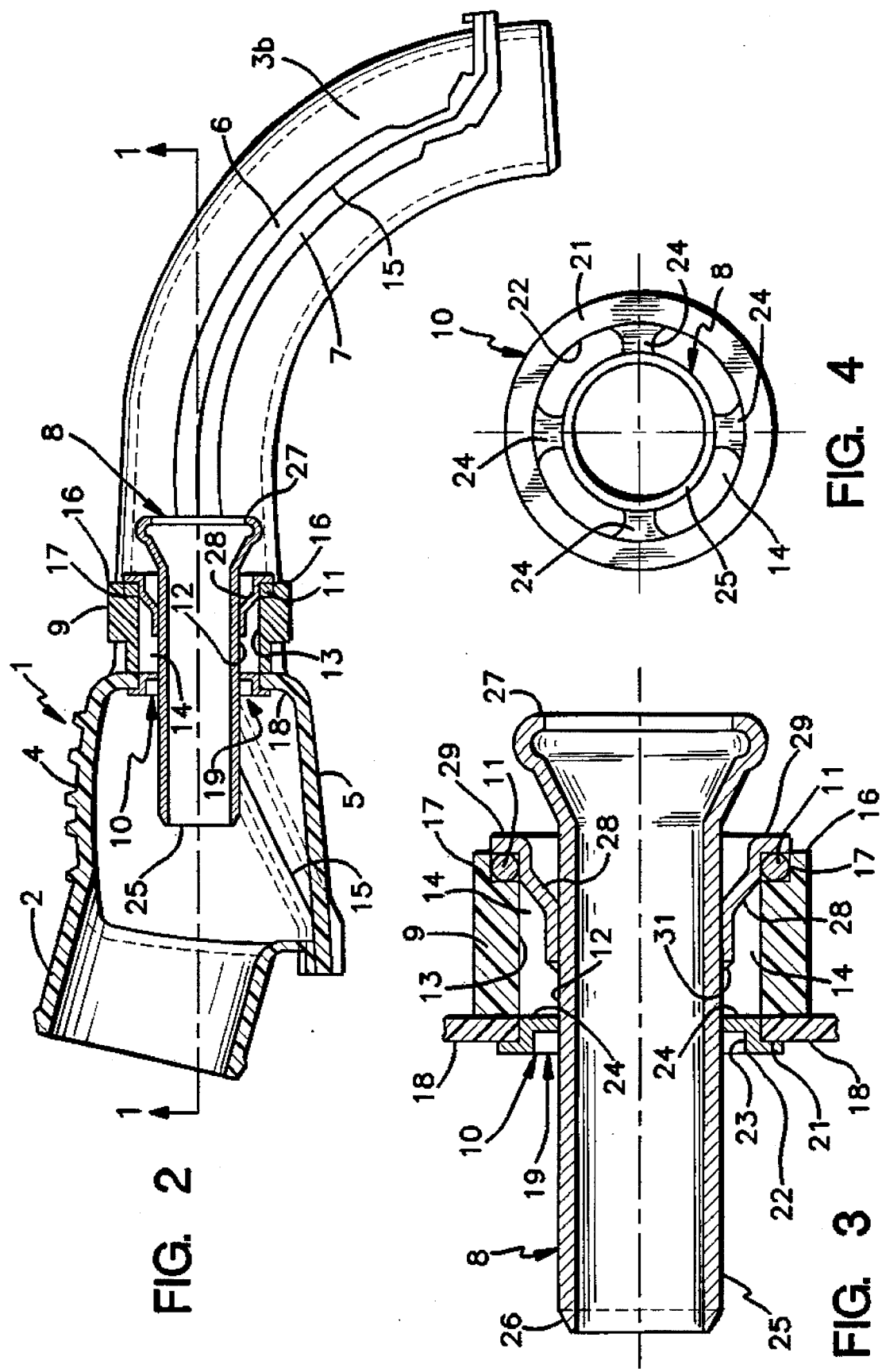

DEVICE FOR FITTING A HOT ELEMENT TO A HOLLOW BODY MADE OF THERMOPLASTIC INCLUDING AT LEAST ONE COLD FLUID INLET, AND HOLLOW BODY INCLUDING SUCH A DEVICE

The present invention relates to a device for fitting a hot element to a hollow body including at least one cold fluid inlet pipe and at least one fluid outlet pipe, said hollow body being made of a thermoplastic which cannot withstand the temperature of the hot element.

The present invention also relates to a hollow body made of thermoplastic including such a device for fitting a hot element, the temperature of which said thermoplastic cannot withstand, onto said hollow body.

It is known that hollow bodies made of thermoplastic are used in increasingly numerous and varied technical fields. Indeed, these hollow bodies are generally simple and economical to manufacture and may have a certain predetermined mechanical strength. The available manufacturing techniques make it possible to produce bodies of complicated shapes. These bodies are furthermore lightweight and have beneficial electrical, thermal and acoustic insulation properties. They are thus increasingly competing with hollow bodies made of lightweight alloy, which are markedly more expensive.

In contrast, it is known that these hollow bodies have a significant limitation as regards the temperature to which they may be subjected, especially pointwise, without losing their mechanical properties.

It is generally believed that fitting a hot element to a hollow body made of thermoplastic, the temperature of which said thermoplastic cannot withstand, would require solutions of which would outweigh the economic advantage of the use of thermoplastic relative to the production of the same hollow body in lightweight alloy. Furthermore, possible users would fear a lack of reliability in the use of such a fitting.

EP-A-0,486,338 makes known an exhaust gas recirculation device for an internal combustion engine of the type comprising a pipe for recirculating gases from the exhaust manifold to the intake manifold. The latter is made of a composite material. The end part of the recirculation pipe connected to the intake manifold emerging in it comprises a double wall defining an annular chamber which thermally insulates the wall of the intake manifold from the internal wall of the end part.

The end part emerges downstream of the flap for letting air into the intake manifold, close to it, and the annular chamber is in fluid communication on the one hand with the intake manifold and, on the other hand, with an air circuit for setting the idle speed of the engine so that the idle air flowing through the annular chamber cools the wall of the intake manifold in contact with the external wall of the end part.

The device is of relatively complicated and costly structure. Furthermore, the flow rate of air for setting the idle speed is substantially constant regardless of the speed/load conditions of the engine, and can barely vary as a function of the flow rate of recirculated exhaust gas.

The object of the present invention is to overcome the abovementioned drawbacks, and to provide a device of the abovementioned type which is of simple and economical structure and easy to use while being extremely reliable.

The device according to the invention is thus a device for fitting a hot element to a hollow body including at least one cold fluid inlet pipe and at least one fluid outlet pipe, said hollow body being made of a thermoplastic which cannot withstand the temperature of the hot element, the device including an inlet adapter which surrounds said hot element, which is fixed to the hollow body and emerges in it through an opening, and which is also produced from a thermoplastic, retaining means for keeping the hot element inside the inlet adapter, out of contact with it, sealing means located between the outer peripheral surface of the hot element and the inner peripheral surface of the adapter, and means for cooling the space lying between the adapter and the hot element.

According to the invention, this device is one wherein the inlet adapter is separated from the cold fluid inlet pipe, and wherein the device further includes means for sending some of the cold fluid which has penetrated the hollow body by said pipe into said space, through said opening.

The presence of the cold fluid in the space lying between the adapter and the hot element is sufficient to reduce direct heat exchanges by conduction and convection between the hot element and the adapter, and those provided for by the guide and retaining means, on the one hand, and by the sealing means on the other hand. The temperature of the thermoplastic thus at no point exceeds a predetermined safety threshold.

It is thus possible to fit the hot element onto the hollow body in a very simple, economical and reliable manner.

Indeed, the means of the invention do not complicate the production of the hollow body from a thermoplastic, and are means which are hot in themselves and can be adapted to each particular case so as not to diminish the reliability of the device of the invention.

According to a beneficial version of the invention, the hot element is a pipe for letting hot fluid. into the hollow body, the thermoplastic of the hollow body being capable of withstanding the temperature of the mixture of cold and hot fluids.

According to another aspect of the invention, the hollow body envisaged by the invention includes at least one cold fluid inlet pipe, at least one fluid outlet and at least one hot element, said hollow body being made of a thermoplastic which cannot withstand the temperature of the hot elements it is one which includes a device in accordance with the invention for fitting said hot element.

According to an advantageous version of the invention, this hollow body is an air intake manifold for an internal combustion engine including at least one fresh air inlet pipe and several air outlet pipes designed to direct air toward the various cylinders of the engine.

According to a preferred version of the invention, said manifold receives at least one pipe for letting in recirculated hot exhaust gases.

Other features and advantages of the invention will emerge in the detailed description hereinbelow.

In the appended drawings, given solely by way of non-limiting examples:

FIG. 2 is a section on II—II of FIG. 1 of the manifold of FIG. 1 equipped with a device in accordance with a first embodiment of the invention;

FIG. 3 is an enlarged detail of the device of FIG. 2;

FIG. 4 is a view from the left of the device of FIG. 3;

Figure 1:
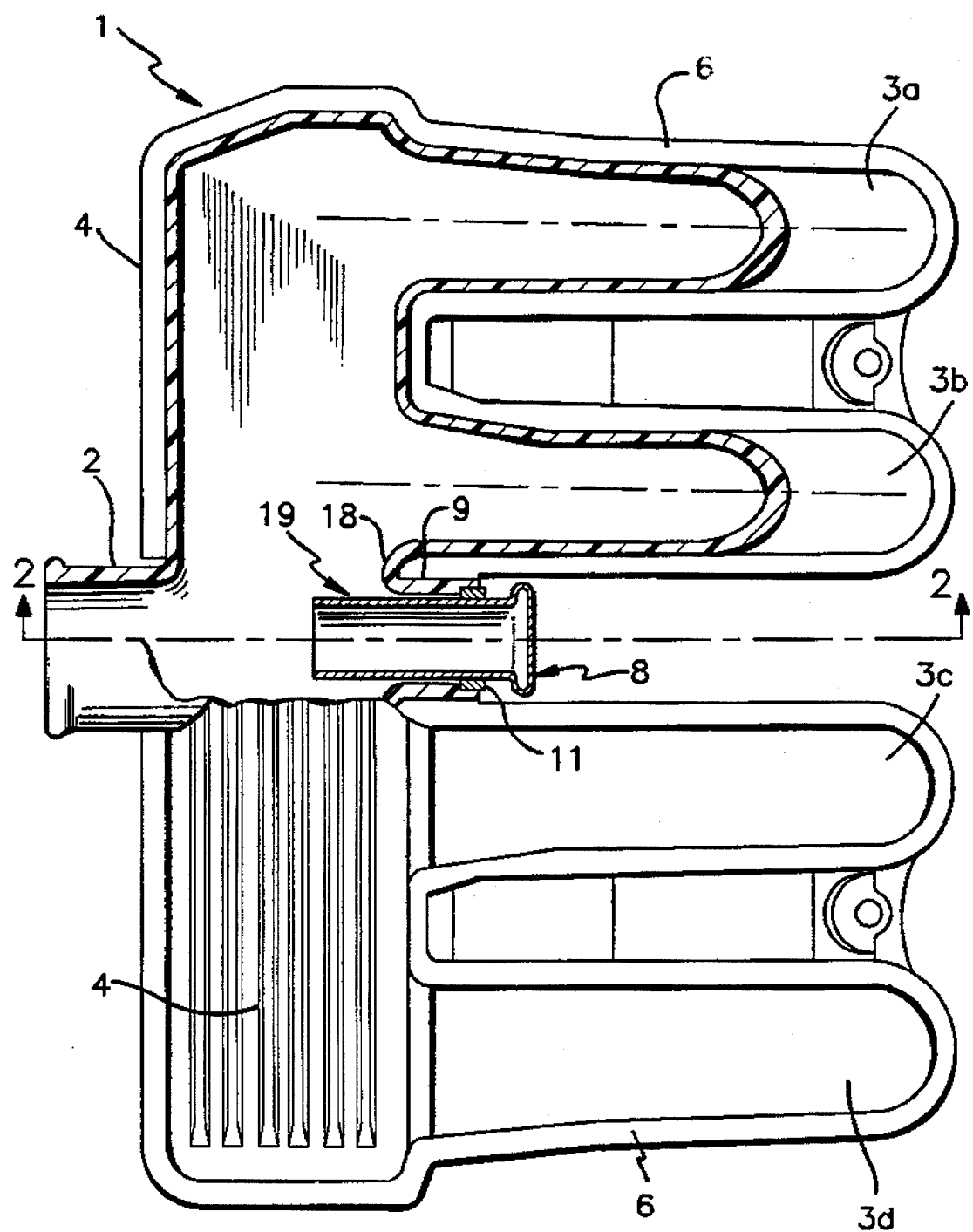
FIG. 1 is a plan view, partially in section on I—I of FIG. 2, of an internal combustion engine air intake manifold in accordance with the invention equipped with an exhaust gas recirculation pipe.

In the embodiment represented in FIG. 1, the air intake manifold 1 for an internal combustion engine includes, in the conventional fashion, at least one fresh air inlet pipe 2 and several air outlet pipes 3a, 3b, 3c, 3d designed to direct air toward the various cylinders (not represented) of the engine.

In this example, the manifold 1 is produced in the known manner from two half shells 4, 5, manufactured by injecting a thermoplastic under pressure and welded to one another, for example by vibration welding, along their respective peripheral flanges 6, 7 (see FIG. 2). The air inlet pipe 2 completely forms part of the upper half shell 4.

In a way which is also known, the thermoplastic may be a polyamide, for example nylon 6—6 or nylon 6, filled with glass fibers, it being possible for the filling level to reach 30 to 50% by weight of the thermoplastic. This thermoplastic may equally well be polythenylene sulfide (PPS) filled with glass fibers and/or an inorganic filler, or any other thermoplastic designed for this use.

It is known that PPS can withstand an operating temperature of 180° to 200° C. without any problem, whereas polyamide can barely withstand a temperature greater than about 120° C.

According to the invention, the manifold 1 receives at least one pipe 8 for letting in recirculated hot exhaust gases, this pipe 8 being connected by a pipe which is not represented to the exhaust circuit of the engine.

It is known that recirculated exhaust gases may reach temperatures of the order of 300° to 500° C. approximately, depending on the distance separating the exhaust manifold from the take-off point, and depending on the configuration of the circuit which they take. It is also known that, depending on the time and speed/load conditions of the engine, the mass flow rate of recirculated exhaust gases may vary from 0 to 50% approximately of the total mass flow rate of the exhaust gases emitted by the engine. The thermoplastic, whatever it is, of the half shells 4 and 5 cannot withstand the temperature of these recirculated gases, which is that of the pipe 8.

In the example represented, the pipe 8 is placed substantially in the mid plane of the manifold 1, between the two sets of outlet pipes 3a and 3b on one side, 3c and 3d on the other side, substantially facing the cold air inlet pipe 2. This arrangement has no critical nature and may be replaced by any other.

In the embodiment represented in FIGS. 2 to 4, the device of the invention for fitting the recirculation pipe 8 onto the manifold i includes an inlet adapter 9 of a single piece with the manifold 1 and intended to surround the pipe 8 without contact, guide and retaining means 10 for keeping the pipe 8 out of contact with the inlet adapter 9 and retaining it inside the latter, means 11 for sealing between the outer peripheral surface 12 of the pipe 8 and the inner peripheral surface 13 of the adapter 9, and means for making at least some of the cold air penetrating the manifold 1 circulate through the space 14 lying between the adapter 9 and the pipe 8.

In this example, the adapter 9 is astride the surface 15 whereby the two half shells 4, 5 are joined together by welding, which makes it difficult to produce it as two cylinder halves respectively of a single piece with the half shells 4 and 5 and joined together by vibration welding.

In the embodiment represented in FIGS. 2 and 3, the adapter 9 is manufactured, for example, by overmolding over the manifold 1 already joined together. This embodiment thus makes it possible, if need be, to produce the two half shells from a material which welds very well, for example a polyamide, and then to fix an adapter 9 made of a thermoplastic which is more temperature-resistant than polyamide, for example PPS, onto the joined-together manifold 1.

The adapter 9, at its free end 16, has a shoulder 17 serving as a seat for the sealing gasket 11. The gasket 11 is made from a known substance which resists the temperatures involved, for example silicon, or materials sold under the names of VITON or VAMAC, which are commercial brand names, or of other appropriate materials.

As FIGS. 3 and 4 represent in detail, the guide and retaining means comprise a washer 10 designed to bear on the inner wall 18 of the manifold 1 along the peripheral edge of the opening 19 made in the wall 18 and to which the adapter 9 is connected, and including claws 24 projecting radially inward in order to guide and retain the pipe 8.

The washer 10 thus has an external collar 21 bearing on the wall 18, and the internal peripheral edge 22 of which forms a shoulder with an axial length 23 which extends over the thickness of the wall of the manifold 1, and which is extended by four tabs 24 acting as claws knocked over radially inward. The washer 10 is preferably produced as a single piece in a thin sheet of a metal which can withstand the temperatures involved, for example stainless steel: the claws 24 are thus capable of elastically retaining the pipe 8 inside the adapter 9.

The pipe 8 has its end 25 intended to penetrate inside the manifold 1 chamfered at 26 so as to be able to penetrate easily between the claws 24.

The second end 27 of the pipe 8 has any shape whatever designed to be connected to the pipe (not represented) for supplying the recirculated exhaust gases, in this case, a flared shape.

As represented, the pipe 8 on its outer peripheral surface, in the region of its inlet into the adapter 9, has a collar 28 projecting radially outward and designed to bear on the sealing gasket 11.

This collar 28 flares radially outward and axially and ends in a radial flange 29 which bears on the sealing gasket 11, preferably without touching the adapter 9. The gasket 11 is housed in the inner shoulder 17 formed in the thickness of the adapter 9.

The pipe 8 is preferably made of steel, especially stainless steel, which has the dual advantage of resisting corrosion from the exhaust gases and having practically the lowest thermal conductivity of all usable metals, and the collar 28 is formed of the same metal and welded to the pipe 8 at 31.

Figure 5:
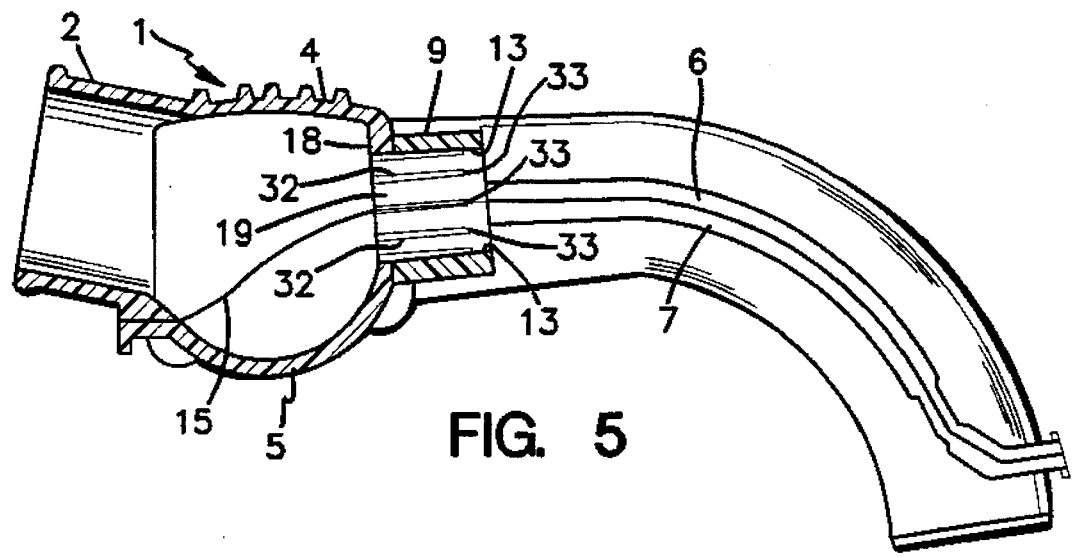
FIG. 5 is a view similar to FIG. 2, the manifold being designed to receive a device in accordance with another embodiment of the invention.
Figure 6:
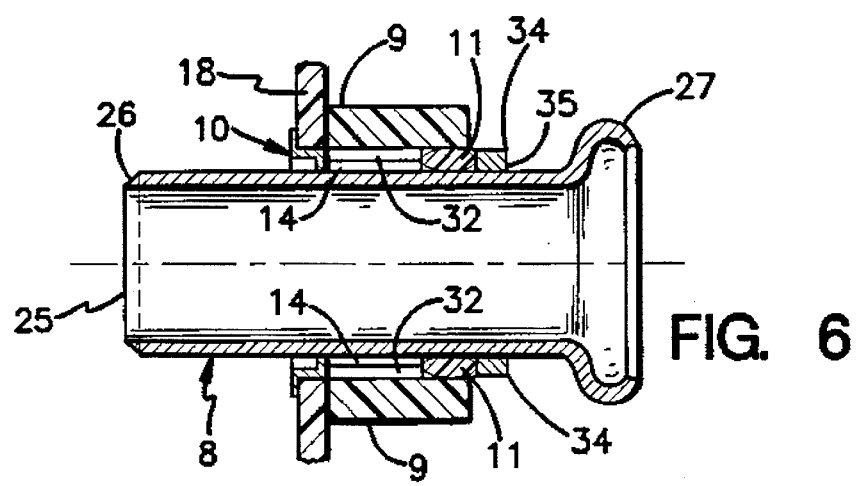
FIG. 6 is a view similar to FIG. 3 of the device designed to equip the manifold of FIG. 5.

In the embodiment represented in FIGS. 5 and 6, the adapter 9, on its inner peripheral surface 13, has elements forming a seating pointing radially inward and designed to act as a limit stop for the sealing gasket 11: in this example, these seating elements are longitudinal grooves 32 projecting inward and the upstream end 33 of which acts as a limit stop for the gasket 11.

In this example, the pipe 8 on its outer peripheral surface has a single ring 34 welded onto this pipe at 35 and acting as a stop for the gasket 11.

In these two embodiments, the pipe 8 for letting in hot recirculated exhaust gases is substantially facing the cold air inlet pipe 2. The cold air can therefore penetrate, between the claws 20, into the space 14 lying between the adapter 9 and the pipe 8; this air thus cools the washer 10, the gasket 11, creates a cushion of insulating air in the space 14 between the pipe 8 and the adapter 9, which considerably reduces heat exchanges through conduction from one to the other, and renews this cushion of air, which also reduces heat exchanges by convection.

It will be noted that in the embodiment of FIGS. 2 to 4, the thickness of the space 14 is markedly greater than that formed in the embodiment of FIGS. 5 and 6. In the latter mode, grooves axially duct the cold air as far as the gasket 11 bearing on their upstream ends 33. The gasket 11 is thus cooled more effectively than in the case of the first mode described.

The fitting of the device according to the invention seems obvious in the light of the description hereinabove. The manifold 1 is produced in any manner whatever, either directly with the adapter 9, or with an adapter 9 fitted separately over the opening 19 by overmolding.

The washer 10 is inserted through the pipe 2 and kept in place on the opening 19 while the gasket 11 and the pipe 8 which passes between the claws 24 are introduced from the other side Of the manifold 1. When the flange 29 or the ring 34 are in contact with the gasket 11, itself in abutment on the shoulder 30 or on the ends 33 of the grooves 32, the elasticity of the claws 24 opposes the extraction of the pipe 8.

Figure 7:
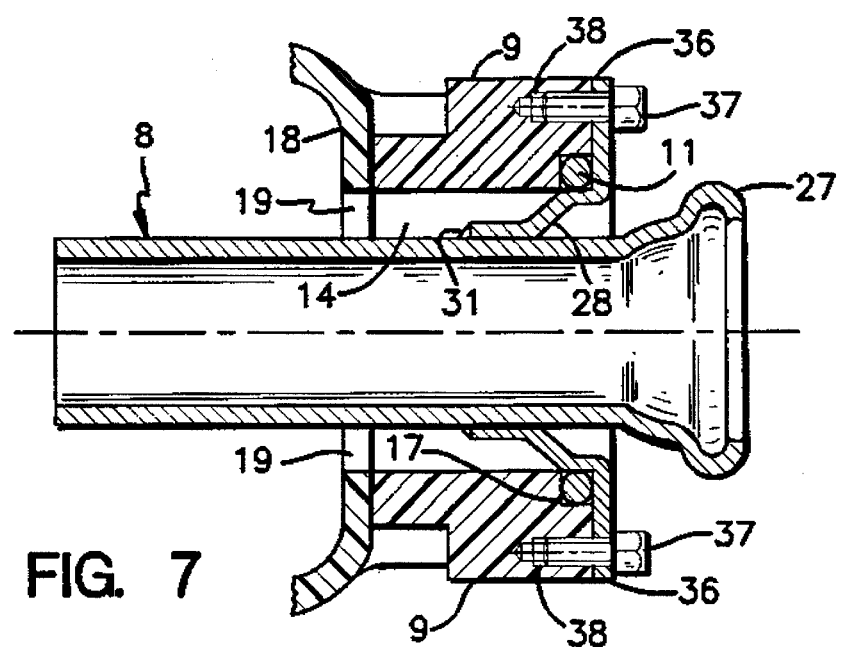
FIG. 7 is a view similar to FIG. 3 of the device in accordance with another embodiment of the invention.

In the embodiment of FIG. 7, the pipe 8 is provided with a collar 28 ending in a radial flange 36 which extends substantially over the entire thickness of the adapter 9. The sealing gasket 11 bears on the shoulder 17. The pipe 8 is fixed to the adapter 9 by screws 37 which pass through the flange 36 and are screwed into holes 38 made in the longitudinal direction in the thickness of the adapter 9. This thickness is obviously specified as a consequence of this.

Experience has effectively shown that if the dimension of the space 14 is sufficient to allow correct cooling of the pipe 8 and of the collar 28, the temperature of the flange 36 may reach temperature levels which a thermoplastic such as PPS can withstand, bearing in mind the envisaged extent to which exhaust gases are recirculated.

It is nevertheless obvious that it is possible to incorporate a thermally insulating gasket (not represented) between the end 16 of the adapter 9 and the radial flange 36.

The opening 19 is thus wide open for the introduction of cold air into the space 14, and the screws 38 provide sufficiently accurate guidance of the pipe 8 inside the adapter 9.

Of course, the invention is not limited to the embodiments which have just been described and numerous changes and modifications may be made to these without departing from the scope of the invention.

Thus, the invention is applicable to hollow bodies other than an air intake manifold, and to hot elements other than the pipe for the recirculation of recirculated hot exhaust gases: the hot element may thus consist, for example, of a plug or resistive element for heating air for facilitating cold-starting of the engine.

The manifold may include several cold air inlet pipes, several recirculated exhaust gas inlet pipes and any number of outlet pipes.

The exhaust gas inlet pipe and the air inlet pipe may be placed in positions and orientations which are different from those represented, relative to the air manifold and relative to each other.

The device of the invention may of course include an inlet letting some of the flow of intake air directly into the space 14 separating the adapter 9 from the pipe 8, this flow constituting a dynamic cold thermal flow, as opposed to the semi-inert flow as described in the case where this air penetrates a space 14 with a blind end.

Of course, what has been termed cold air in the foregoing description is the air which arrives from the air filter, and whose temperature may vary between respective extreme limits which may range from −40° C. to +80° or +90° C. approximately, this air in any case constituting the "cold" fluid with which the recirculated exhaust gases are mixed, these always being markedly hotter.

Finally, all the elements described hereinabove may be combined with each other and/or replaced by equivalents.

I claim:

1. The combination of a hollow body (1) including at least one cold fluid inlet pipe (2) and at least one fluid outlet pipe (3a, 3b, 3c, 3d) and a hot element (8), said hollow body (1) being made of a thermoplastic which cannot withstand the temperature of the hot element (8), an inlet adapter (9) which surrounds said hot element (8), said inlet adapter (9) beinq fixed to the hollow body (1) and emerging from said body about an opening (19), said inlet adapter beinq also produced from a thermoplastic, retaining means (10, 28) for keeping the hot element (8) inside the inlet adapter (9), out of contact with the inlet adapter (9), sealing means (11) located between the outer peripheral surface (12) of the hot element (8) and the inner peripheral surface (13) of the adapter (9), and means for cooling the space (14) lying between the adapter (9) and the hot element (8), wherein the adapter (9) is separated from said at least one cold fluid inlet pipe (2), wherein the space (14) lying between the outer peripheral surface (12) of the hot element (8) and the inner peripheral surface (13) of the adapter (9) is a space with a blind end, and wherein the device further includes means for sending some of the cold fluid which has entered the hollow body (1) by said at least one cold fluid inlet pipe (2) into the space with a blind end (14), through the opening (19) from inside the hollow body (1), and wherein the space (14) has a predetermined dimension such that said some of the cold fluid cools the pipe (8) and the retaining means (10, (28).

2. The combination as claimed in claim 1, wherein the retaining means comprise an element (10) dlesigned to bear on the inner wall (18) of the hollow body (1) along the peripheral edge of the opening (19) to which the adapter (9) is connected, and includes tongues (24) projecting radially inward in order to guide and retain the hot element (8).

3. The combination as claimed in claim 2, wherein the tongues (24) are designed to act as claws and elastically to oppose a withdrawal of the hot element (8).

4. The combination as claimed in claim 1, wherein the adapter (9) is made of a single piece with the hollow body (1) .

5. The combination as claimed in claim 1, wherein the hot element (8) on its outer peripheral surface (12), in the region of its inlet into the adapter (9), has elements (28, 34, 36) projecting radially outward and designed to bear on the sealing means (11).

6. The combination as claimed in claim 1, wherein the adapter (9) on its inner peripheral surface has elements (32, 33) forming a seating designed to act as a stop piece for the sealing means (11).

7. The combination as claimed in claim 6, wherein the elements forming the seating are longitudinal grooves (32) projecting inward and the upstream end (33) of which acts as a stop piece for the sealing means (11).

8. The combination as claimed in claim 1, wherein the hot element (8) is a pipe for letting hot fluid into the hollow body (1), the thermoplastic of the hollow body being capable of withstanding the temperature of the mixture of cold and hot fluids.

9. The combination as claimed in claim 1, wherein the cold fluid inlet pipe (2) is situated substantially facing the hot element (8).

10. The combination as claimed in claim 1, wherein said hollow body (1) is an air intake manifold for an internal combustion engine including at least one fresh air inlet pipe (2) and several air outlet pipes (3a, 3b, 3c, 3d) designed to direct air toward the various cylinders of the engine.

11. The combination as claimed in claim 10, wherein said manifold (1) receives at least one pipe (8) for letting in recirculated hot exhaust gases.

* * * * *